United States Patent [19]

Servais et al.

[11] 4,036,519
[45] * July 19, 1977

[54] STREAMLINING APPARATUS FOR ARTICULATED ROAD VEHICLE

[75] Inventors: Ronald A. Servais, Dayton; Paul T. Bauer, Bellbrook; Alan F. Meckstroth, Dayton, all of Ohio

[73] Assignee: Aerospan Corporation, Dayton, Ohio

[*] Notice: The portion of the term of this patent subsequent to Mar. 23, 1993, has been disclaimed.

[21] Appl. No.: 667,632

[22] Filed: Mar. 17, 1976

Related U.S. Application Data

[63] Continuation of Ser. No. 500,075, Aug. 23, 1974, Pat. No. 3,945,677.

[51] Int. Cl.² .......................................... B62D 35/00
[52] U.S. Cl. .................................. 296/1 S; 105/2 R; 296/91
[58] Field of Search ............... 296/1 S, 91; 105/2 R, 105/2 A, 11; 52/2; 244/145, 149

[56] References Cited

U.S. PATENT DOCUMENTS

| 2,737,411 | 3/1956 | Potter | 296/1 S |
| 3,697,120 | 10/1972 | Saunders | 296/1 S |
| 3,834,752 | 9/1974 | Cook | 296/1 S |

Primary Examiner—Joseph F. Peters, Jr.
Assistant Examiner—John A. Carroll
Attorney, Agent, or Firm—Jacox & Meckstroth

[57] ABSTRACT

An air inflated bag of flexible sheet material includes a front portion which is mounted on the body or cab of a vehicle such as a tractor hitched to a semi-trailer. A rear portion of the inflated bag extends between the cab and the trailer body to provide for a smooth non-turbulent-flow of air around the cab and to the side and top walls of the trailer body for significantly reducing the aerodynamic drag on the tractor-trailer vehicle. The front portion of the bag is provided with a generally horizontal inlet which is located directly above the front windshield of the cab to direct a portion of the upward flow of air over the cab into the bag and thereby effect dynamic inflation of the bag at a predetermined road speed. The bag may be collapsed to a folded condition adjacent the cab for when the tractor is being driven without a trailer, and a bottom recess is formed within the rear portion of the bag to provide for extending service lines between the cab and the trailer. A low flow of air may be provided through the bag for supplying air to an air conditioning or refrigeration system, and the bag may be made adjustable for accommodating variations in the space between the cab and the trailer.

10 Claims, 6 Drawing Figures

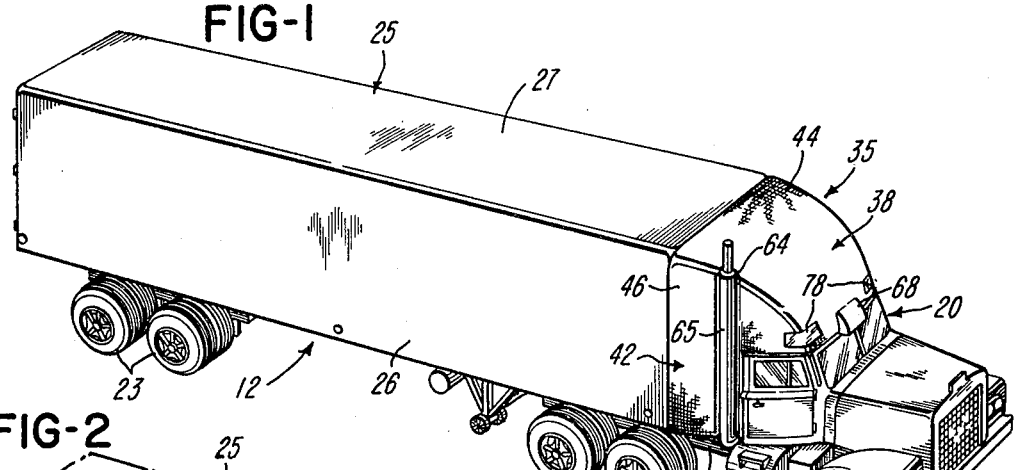

STREAMLINING APPARATUS FOR ARTICULATED ROAD VEHICLE

This application is a continuation of application Ser. No. 500,075, filed Aug. 23, 1974 and now issued a U.S. Pat. No. 3,945,677.

BACKGROUND OF THE INVENTION

There have been numerous devices either proposed or used for reducing the aerodynamic drag on an articulated road vehicle such as a tractor and semi-trailer vehicle, to provide for a smoother less turbulent flow of air from the cab of the tractor to the body of the trailer and across the gap between the cab and trailer body. For example, U.S. Pats. No. 3,241,876, No. 3,348,873 and No. 3,695,673 disclose various types of shields or air flow diverters for mounting on the top wall or roof of the tractor cab. Other types of air deflectors or controllers are adapted to be mounted on the front portion of the trailer body, for example, as disclosed in U.S. Pat. No. 2,863,695 and No. 3,697,120. Another solution for streamlining a tractor-trailer vehicle is by the use of telescoping air shields such as disclosed in U.S. Pat. No. 3,711,146 and U.S. Pat. No. 2,737,411 discloses an inflatable streamlining envelope which is mounted on the rear of a truck body.

In the design of any device or apparatus for reducing the aerodynamic drag on a tractor-trailer vehicle, it is highly desirable to obtain a maximum decrease in aerodynamic drag while minimizing the additional weight which is added to the vehicle. Furthermore, the cost of the apparatus must be economical in reference to the decrease in fuel consumption which results from a reduction in the aerodynamic drag. It has also been found highly desirable to provide for streamlining the flow of air over and around a tractor-trailer vehicle in order to reduce the aerodynamic influence or sidewash of air on passing automobiles and other vehicles and thereby increase the safety in passing. The streamline flow also provides for greater stability and control of the tractor-trailer vehicle and for a reduction in the noise level of the air flow around and over the vehicle.

It is also well known that a crosswind flow of air within the gap between the tractor cab and the trailer body increases the aerodynamic drag due to the force of the wind against the entire front surface area of the trailer body. A more detailed discussion of the flow turbulence over and around a semi-truck is set forth in an article entitled "Truck Aerodynamics" and published by General Motors Corporation in SAE Transactions, Volume 70, 1962, pp. 297–308, and in an article entitled "Beat the Built-In Head" and published in the September, 1973 issue of Commercial Car Journal.

SUMMARY OF THE INVENTION

The present invention is directed to improved apparatus for streamlining the air flow over, around and between a towing vehicle and a trailer, and which provides all the desirable advantages mentioned above. In particular, the streamlining apparatus of the invention provides for a significant reduction in the aerodynamic drag on a tractor-trailer vehicle with only a small increase in the overall weight of the vehicle and is relatively inexpensive and simple in construction and operation. The apparatus of the invention is also adapted for convenient mounting on the cabs of existing semi-trucks or tractors and may also be installed on tractors which incorporate sleeper units. The streamlining apparatus will further accommodate substantially all semi-trailers which are generally standard in width and height, and is especially effective at speeds above 25 miles per hour when the aerodynamic drag becomes significant and increases exponentially with speed.

In accordance with one embodiment of the invention, an inflatable bag is formed of a fabric reinforced vinyl film material and includes a front portion which is attached to the top wall or roof of a tractor cab around the periphery of the roof. The bag also includes a rear portion which is adapted to fill at least a part of the space or gap between the tractor cab and the trailer body and which cooperates with the front portion to form a smoothly curved top surface extending from the forward edge of the tractor cab to the substantially higher forward edge of the trailer body as well as side surfaces which extend from the sides of the cab to the sides of the trailer body. The front portion of the bag is provided with a downwardly facing scoop which forms an air inlet for directing a portion of the air blowing upwardly over the front windshield into the bag to provide for dynamically inflating the bag when the vehicle reaches a predetermined speed, for example, 25 mph.

Other features and advantages of the invention will be apparent from the following description, the accompanying drawing and the appended claims.

BRIEF DESCRIPTION OF THE DRAWING

FIG. 1 is a perspective view of a semi-truck or tractor-trailer vehicle and showing a streamlining air bag constructed in accordance with the invention and in its inflated condition;

FIG. 2 is a perspective view of the tractor shown in FIG. 1 and illustrating the streamlining air bag in a completely collapsed or deflated condition and with a portion of the semi-trailer shown in phantom;

FIG. 3 is a perspective view of the inflated air bag shown in FIG. 1 and with a portion of the bag broken away to show internal construction;

FIG. 4 is a perspective view of a metal mounting frame which is adapted to be positioned within the air bag shown in FIGS. 1–3;

FIG. 5 is a fragmentary side elevational view of the tractor and inflated air bag, and with a portion of the bag broken away adjacent the air inlet; and FIG. 6 is a fragmentary perspective view similar to FIG. 1 and illustrating a modified tractor and air bag in accordance with the invention.

DESCRIPTION OF THE PREFERRED EMBODIMENTS

Referring to the drawing, a conventional seim-truck or tractor 10 is coupled to a conventional semi-trailer 12 by a fifth wheel 14 (FIG. 2) to provide for normal articulating movement between the tractor 10 and trailer 12. In general, the tractor 10 includes a chassis 16 which is supported by a set of wheels 17, and a cab 20 is mounted on the chassis 16. For purpose of illustration, the tractor 10 is of the type wherein the engine is located forward of the cab 20. However, it is to be understood that the apparatus of the invention may also be used with a tractor wherein the cab is located generally above the engine, commonly referred to as a "cab-over" tractor. A sleeper unit (not shown) may also be located directly behind the cab 20 or may be formed as an integral part of the cab. The semi-trailer 12 includes a frame which is supported by a set of rear wheels 23 and on which is mounted an elongated box-like body 25 including a set of side walls 26 which are rigidly connected by a top wall 27 and a front wall 28 (FIG. 2).

In accordance with the present invention, a collapsible and dynamically inflatable bag 35 extends above the cab 20 of the tractor 10 and is adapted to project to the front wall 28 of the semi-trailer body 25 for providing a substantially smoother flow of air from the tractor 10 to the trailer 12. Preferably, the collapsible bag 35 is formed of a vinyl film material reinforced with a woven fabric such as nylon. However, the bag 35 may be formed of other flexible sheet materials such as rubberized canvas, Dacron cloth, fiberglass cloth or such other material which is substantially water resistant, is generally air impervious and has substantial resistance to tearing.

The collapsible bag 35 includes a front portion 38 which overlies the top wall or roof of the cab 20 and which integrally connects with a rear portion 42 adapted to extend between the cab 20 and the front wall 28 of the trailer body 25. The front portion 38 and rear portion 42 have a common curved top wall 44 which connects a set of generally flat vertical side walls 46 and 48 (FIG. 3). A rear wall 49 also connects with the side and top walls and has substantially the same outer rectangular dimensions as the front wall 28 of the trailer body 25. The front protion 38 of the bag 35 also includes an inner or bottom wall (not shown) which overlies the roof of the cab 20 and connects with a generally inverted U-shaped back wall 52 (FIG. 3) which lies generally adjacent the rear wall of the cab 20 and also connects the leading edges of the side walls 46 and 48.

The side walls 46 and 48 are also connected by a bottom wall 54 which has an inverted U-shaped portion 56 for defining a recess or tunnel through which the electrical and fluid control lines extend between the tractor 10 and the trailer 12. The upper part of the U-shaped portion 56 is generally level with the top of the rear window in the cab 20 to permit rear viewing during attachment of the trailer 12. As shown in FIG. 3, the rear portions of the top and side walls of the bag 35 are folded over on to the rear wall 49 and are retained by twist-type fasteners 58 to provide for adjusting or increasing the depth of the rear portion 42 of the bag for accommodating different gaps between the cab 20 and the trailer body 25.

The various walls of the bag 35 are connected together by suitable stitching and/or cement to form airtight seams. The bag 35 is attached to the cab 20 of the tractor 10 by a formed U-shaped frame 60 (FIG. 4) which is inserted into the front portion 38 of the bag and conforms to the peripheral configuration of the roof of the cab. The frame 60 is secured to the roof of the cab 20 by suitable fasteners (not shown) such as inverted U-shaped clamps or by a retaining band such as a cable which extends under the outwardly projecting gutter of the cab roof. The frame 60 also functions to form a continuous contact between the front portion 38 of the bag 35 and the roof of the cab 20 to provide for a smooth uninterrupted air flow from the front and side walls of the cab to the bag.

It is also apparent that the side walls 46 and 48 and the top wall 44 may be attached or clamped directly to the cab 20 by a peripherally shaped frame or clamping strip and a continuous resilient sealing strip so that the inner walls of the bag lying adjacent the cab 20 may be eliminated. As illustrated in FIGS. 1 and 3, the right side wall 46 of the bag 35 is provided with a part-cylindrical recess 64 for receiving the vertically extending exhaust pipe and muffler system 65 of the tractor 10. The recess 64 may be omitted when the bag 35 is used on a tractor which has a lower engine exhaust system, or the recess may have a different shape to accommodate an air filter positioned directly behind the cab.

As shown in FIGS. 1 and 5, the collapsible bag 35 is provided with a generally horizontal inlet 66 which is defined by a downwardly facing scoop-like inlet portion 68 of the bag. Preferably, the inlet portion 68 of the bag is located directly above one or both of the windshields of the cab 20 in order to capture a portion of the upward flow of air over the tractor 10. The air inlet 66 is of sufficient size so that when the tractor-trailer vehicle attains a predetermined speed, for example, 20 to 25 miles per hour, the bag 35 inflates to a fully inflated condition (FIG. 1) causing the rear wall 49 of the bag 35 to engage the front wall 28 of the railer body 25. Thus the bag 35 is dynamically inflated by ramming air into the bag, and the outer exposed walls 44, 46 and 48 of the inflated bag provide for a smooth, substantially non-turbulent flow of air from and over the cab 20 to the trailer body 25.

As set of openings 72 (exaggerated in FIG. 3) are formed within the bottom wall 54 of the bag 35 and provide for draining collected moisture within the bag 35. The openings 72 also provide for a continouous low flow of air through the bag 35 so that the air may be supplied to an air conditioning evaporator unit mounted on the roof of the cab 20. The continuous low flow of air may also be used to supply air to a refrigeration evaporator unit mounted on the front wall 28 of the trailer body 25 by providing an opening within the rear wall 49 of the bag 35. As shown in FIG. 5, the inlet scoop portion 68 of the bag 35 is held in the position shown in FIGS. 1 and 5 by a collapsible extension 76 of the frame 60. A set of internal webs or straps (not shown) connect the outer walls of the bag 35 with the inner walls to assure that the outer walls do not bulge outwardly beyond the desired streamlining configuration.

As also shown in FIG. 1, a set of transparent panels 78 are mounted within the front portion 38 of the bag 35 and provide for viewing the running lights which are mounted on the roof of the cab 20. Preferably, the panels 78 are formed of a flexible transparent plastics material and are stitched and/or cemented to the vinyl film material forming the top and side walls of the bag 35. In place of the transparent panels 78, a single transparent rigid frame or panel may be used along the lower portion of the front bag portion 38 and serve also as an attachment for the front bag portion 28 to the roof of the cab 20 in place of the inner frame 60.

When the tractor 10 is not being used for towing a trailer 12 and it is desirable to collapse the bag 35, the walls of the bag may be folded inwardly onto the top and rear walls of th cab 20, as shown in FIG. 2 where the collapsed bag is strapped to the cab 20. In the event the tractor 10 is seldom driven without a trailer 12, the sides of the frame 60 may be provided with a set of antenna-like support rods or members (not shown) which extend upwardly and rearwardly within the rear portion 42 of the bag 35 and serve to support the bag as it begins to collapse when the tractor-trailer vehicle drops below a predetermined speed or has come to a complete stop. The rearward ends of the support rods or members would terminate forward of the front wall 28 of the trailer body 25 so that they do not interfere with turning of the tractor-trailer vehicle and the partial collapsing of the bag.

Referring to FIG. 6 which shows a modification of the invention, a tractor 110 includes a cab 120 which is positioned generally over the engine as a "cab-over" design. The cab 120 includes a rounded front wall 122 which provides for a more streamlined flow of air around the tractor 110. A dynamically inflatable bag 135 is constructed and supported in the same manner as the bag 35 described above, except that the leading top edge portion 137 of the bag 135 is curved to conform to the curvature of the front wall 122 of the cab 120. It has been determined that the embodiment shown in FIG. 6 provides an additional decrease in the drag resistance of the tractor-trailer vehicle in that the bag 135 cooperates with the more streamlined configuration of the cab 120 to provide for a more streamlined flow of air around the tractor 110 and from the tractor 110 to the trailer body 25.

From the drawing and above description, it is apparent that a tractor-trailer vehicle incorporating a collapsible bag constructed in accordance with he present invention, provides several desirable features and advantages. As mentioned above, one primary advantage of the inflated bag 35 or 135 is that it streamlines the air flow over the tractor to the trailer. As a result, the bag significantly reduces the horsepower required to overcome aerodynamic drag on the vehicle, especially as the speed of the vehicle increases. Since the drag increases exponentially with speed, the dynamically inflated bag provides for a significant decrease in fuel consumption, especially when the tractor-trailer vehicle is moving at higher speeds such as between 55 and 75 miles per hour.

The dynamic inflation of the bag 35 or 135 by the ram air flow through the horizontal inlet 66, provides for a simple and inexpensive means for inflating the bag and insures that the bag will remain inflated especially at higher speeds of the vehicle. The bag is also adapted to be partially collapsed by the trailer in response to articulation or turning of the vehicle. Furthermore, by providing for a low continuous flow of air through the bag 35, the bag may be used with tractors having air conditioning units mounted on the cab roof and also be used with refrigerated trailers having a motor driven refrigeration system mounted on the front wall of the trailer. In addition, by arranging the inlet 66 so that it lies substantially within a horizontal plane, the inlet provides no significant drag resistance to forward movement of the vehcile.

As mentioned above, the inflated bag is especially helpful when there is a cross wind relative to the forward direction of the tractor-trailer vehicle. That is, the bag prevents the cross flow of air between the tractor and the trailer and thus not only eliminates the drag force of air exerted on the front wall of the trailer but also significantly reduces the side wash of air from the vehicle. Another important advantage of the invention is that the bag 35 or 135 and the attaching frame 60 are relatively light weight and add very little to the overall weight of the tractor-trailer vehicle.

As also illustrated, the collapsible bag may be provided with adjustment for accommodating different spaces between the rear wall of the tractor cab and the front wall of the trailer body. It is also apparent that the exhaust pipe 65 and it surrounding perforated metal protector may be directed through the bag 35 so that the heat from the exhaust gases will add heat to the air within the bag 35 and thereby prevent accumulation of snow and/or ice on the bag while the vehicle is moving. It is also apparent that the forward part of the front portion 38 of the bag may be formed as a rigid shell mounted on the cab roof and serve as a housing for storing the remaining inflatable portion of the bag when the bag is not in use.

While the forms of apparatus herein described constitute preferred embodiments of the invention, it is to be understood that the invention is not limited to these precise forms of apparatus, and that change may be made therein without departing from the scope and spirit of the invention as defined in the appended claims.

The invention having thus been described, the following is claimed:

1. Apparatus for mounting on a wheel supported road vehicle to streamline the flow of air past the vehicle and to reduce the aerodynamic drag on the vehicle, said apparatus comprising an air enclosure member defining an air chamber and including a flexible wall, means for mounting said enclosure member on the vehicle in a position where said flexible wall projects outwardly from the vehicle and is exposed to the flow of air past the vehcile when the vehicle is moving forwardly along a road, said flexible wall being capable of collapsing inwardly in response to the pressure exerted by the flow of air past the vehicle, means defining a ram air inlet for said air enclosure member, said air inlet being positioned to receive a small portion of the air flowing past the vehicle for pressurizing said chamber with sufficient pressure to avoid collapsing of said flexible wall, and the forward projected area of said inlet is substantially small relative to the forward projected area of said air enclosure member to minimize aerodynamic drag associated with said air inlet.

2. Apparatus as defined in claim 1 wherein said air inlet is located within a forward portion of said air enclosure member and is arranged for receiving a portion of the air flowing upwardly over the vehicle.

3. Apparatus as defined in claim 1 wherein the vehicle includes a cab having a roof, and said flexible wall of said air enclosure member projects upwardly from said roof and covers a substantial portion of said roof.

4. Apparatus as defined in claim 3 wherein said means for mounting said air enclosure member on said vehicle comprise a substantially rigid frame extending generally adjacent the periphery of said roof.

5. Apparatus as defined in claim 3 wherein said means for mounting said air enclosure member on the vehicle comprise a substantially rigid frame including means defining said air inlet within a forward portion of said air enclosure member.

6. Apparatus as defined in claim 1 wherein the vechicle includes a cab having a roof, and said flexible wall of said air enclosure member curves upwardly and rearwardly over the roof.

7. Apparatus as defined in claim 1 wherein said air inlet is disposed in a generally horizontal plane.

8. Apparatus as defined in claim 1 including means forming an air outlet for said air enclosure member, said air outlet having an area smaller than that of said air inlet, and said air outlet cooperates with said air inlet to provide for a continuous flow of air through said chamber in response to forward movement of the vehicle.

9. Apparatus as defined in claim 1 wherein the vehicle includes a cab having a roof, and said air enclosure member is collapsible to a position adjacent said roof.

10. A method of streamlining the flow of air past a wheel supported road vehicle to reduce the aerodynamic drag on the vehicle, comprising the steps of forming an air enclosure member with a flexible wall and a ram air inlet, mounting said air enclosure member on the vehicle in a position where the flexible wall projects outwardly from the vehicle and is exposed to the flow of air past the vehicle when the vehicle is moving forwardly along a road, the flexible wall being formed of relatively light weight material capable of collapsing inwardly in response to he pressure exerted by the flow of air past the vehicle, positioning the air inlet to receive a small portion of the air flowing past the vehicle for pressurizing said chamber with sufficient pressure to avoid collapsing of the flexible wall, and limiting the forward projected area of the inlet substantially smaller than the forward projected area of the air enclosure member to minimize aerodynamic drag associated with the air inlet.

* * * * *